United States Patent [19]
Goodwin

[11] Patent Number: 5,862,500
[45] Date of Patent: *Jan. 19, 1999

[54] APPARATUS AND METHOD FOR RECORDING MOTOR VEHICLE TRAVEL INFORMATION

[75] Inventor: Joel G. Goodwin, Austin, Tex.

[73] Assignee: Tera Tech Incorporated, Austin, Tex.

[*] Notice: This patent issued on a continued prosecution application filed under 37 CFR 1.53(d), and is subject to the twenty year patent term provisions of 35 U.S.C. 154(a)(2).

[21] Appl. No.: 633,130

[22] Filed: Apr. 16, 1996

[51] Int. Cl.⁶ .................................................. G06F 13/00
[52] U.S. Cl. ............................ 701/35; 340/438; 340/439
[58] Field of Search ..................... 364/424.04, 424.034, 364/424.035, 424.038, 551.01, 561; 340/438, 439, 434, 458, 461, 462, 471; 701/35, 29, 30, 33

[56] References Cited

U.S. PATENT DOCUMENTS

| | | | |
|---|---|---|---|
| 3,792,445 | 2/1974 | Bucks et al. | 340/172.5 |
| 4,031,363 | 6/1977 | Freeman et al. | 364/424.04 |
| 4,067,061 | 1/1978 | Juhasz | 364/900 |
| 4,159,490 | 6/1979 | Wood | 360/12 |
| 4,344,136 | 8/1982 | Panik | 364/424 |
| 4,547,781 | 10/1985 | Gelhorn et al. | 346/33 R |
| 4,564,905 | 1/1986 | Masuda et al. | 364/424 |
| 4,593,357 | 6/1986 | Van Ostrand et al. | 364/423.098 |
| 4,685,061 | 8/1987 | Whitaker | 364/424 |
| 4,853,856 | 8/1989 | Haway | 360/5 |
| 4,875,167 | 10/1989 | Price et al. | 364/424.04 |
| 4,939,652 | 7/1990 | Steiner | 364/424.04 |
| 5,046,007 | 9/1991 | McCrery et al. | 364/424.04 |
| 5,239,470 | 8/1993 | Komatsu | 364/424.04 |
| 5,267,159 | 11/1993 | O'Neall | 364/424.04 |
| 5,337,236 | 8/1994 | Fogg et al. | 364/424.04 |
| 5,379,219 | 1/1995 | Ishibashi | 340/438 |
| 5,428,542 | 6/1995 | Liesveld | 364/424.04 |
| 5,497,323 | 3/1996 | McCall et al. | 340/438 |
| 5,550,738 | 8/1996 | Bailey et al. | 364/424.04 |
| 5,638,273 | 6/1997 | Coiner et al. | 364/551.01 |

Primary Examiner—Tan Q. Nguyen
Attorney, Agent, or Firm—Shaffer & Culbertson, L.L.P.; Russell D. Culbertson

[57] ABSTRACT

A vehicle trip recording apparatus collects trip data for manipulation by a separate computer. The computer software contains all the required controls and data manipulation programs for the trip recording device. The trip recording device contains only the hardware to collect and save distance pulses, current time and date, to talk with the computer, and a two button command interface. Of the two button command interface, one of the buttons selects between automatic or manual mode. The second button is a push type and performs the start/stop trip function when the first button is in the manual position. When the first button is in the automatic position, the second button preforms the start/stop calibrate function. Once the trip data has been downloaded into the computer, the trip data can be formatted, printed and saved with the separate computer.

8 Claims, 7 Drawing Sheets

APPARATUS AND METHOD FOR RECORDING MOTOR VEHICLE TRAVEL INFORMATION

BACKGROUND OF THE INVENTION

1. Field of the Invention

The present invention relates in general to vehicle trip data recording devices which use uniform pulses electronically generated, from a drive train, to record distances traveled in a motor vehicle. Specifically, the present invention relates to a device that can record the date, start time, distance travelled, and the stop time of a motor vehicle.

2. Description of Related Art

Many operators use motor vehicles in situations in which it is necessary to monitor and record time and distances traveled. These people are required to distinguish between personal and business use of a motor vehicle in order to pro-rate those expenses which can be used as an income tax deduction. Tracking distances traveled at all times for the complete year is necessary to determine the proper amount of motor vehicle usage which can be written off against federal income taxes.

In another situation it is desirable to keep accurate records of distances traveled in a motor vehicle when the operator reclaims expenses from a client or employer. Currently the vehicle operator is responsible, in most cases, for logging of vehicle activity in order to be reimbursed for vehicle expenses. The manual recording of log information is time consuming and tedious. A different example is the situation in which a motor vehicle, is operated by an employee, and the employer wishes to monitor time and distances traveled in order to determine if unauthorized private use of the vehicle has occurred.

At the present time this motor vehicle usage assessment is more often than not made at the end of the year. The assessment is only a rough guess because of a lack of documentation or a low cost tracking system to collect the vehicle usage information. Great attention to detail on a daily basis is required to record the data necessary to make the proper assessment of vehicle usage. Obviously therefore considerable error in the tax deduction calculation can occur one way or the other because of the wildly inaccurate rough guess technique. Manual recording of distances traveled by a given motor vehicle is a time consuming process and is subject to human error.

Devices of related art, which are intended to assist in collecting motor vehicle usage data, all do more than just collect time/distance travelled. Related art devices have an array of different types of operator interfaces including keypads, buttons, switches and displays to assist the user with categorizing or manipulating the data collected from the time/distance trip recording device. Other devices of related art require the user to categorize the data or information to be collected at the start of each trip. Some devices of related art require that information, such as present odometer reading at the start of a trip or when fuel is added to the vehicle, be entered by the operator when the event occurs.

SUMMARY OF THE INVENTION

It is an object of the present invention to collect and record vehicle trip data including date, start time, distance travelled, and stop time data from a motor vehicle.

It is a further object of the present invention that this trip data collection can occur manually or automatically. In the manual mode, the vehicle operator is required to press a button in order to start the trip data recording process. In the automatic mode, the trip data recording process starts when the vehicle is enabled for travelling such as when the ignition is turned on or the vehicle is placed in drive. The automatic mode will also end the trip recording and store the trip data when the ignition is turned off, the vehicle is placed in park or the vehicle is otherwise disabled. The manual mode trip can be ended by pressing a button or by the same events that end an automatic mode trip.

Another object of the present invention is that operator intervention is not required when the trip data is recorded in automatic mode. Thus the present invention need not be located in the operator compartment of the vehicle to record and store trip data.

Another object of the present invention is to provide a method for the vehicle operator to calibrate the device that records and stores the trip data. Calibration can be in miles, kilometers, or any unit of measure.

Another object of the present invention is the provision of means for downloading recorded trip data from the trip recorder to a personal computer with a standard computer data interface. Once the trip data is in the computer, a custom application program running on the computer may be used to manipulate the trip data as desired. Examples of what the custom application program could do with the trip data are; displaying, editing, printing, and mass storage.

Another object of the present invention is that parameters like time, date and operational information can be programmed into the trip recorder only through the computer data interface. Another example of operational information would be the programming of the register that is used to divide the string of electrical distance pulses coming into the present invention into useful units. This serial interface eliminates the need for extra buttons and displays to be attached to the present invention for entry of parametric data.

Another object of this invention is to be able to connect a notebook type computer to the trip recorder while trip data is being collected in the vehicle. This allows the user to immediately document the purpose for the trip.

Another object of this invention is to have an enclosure that is approximately the same size as a conventional pack of cigarettes so as to be pocket portable. The small size makes it easy to remove the present invention from the vehicle in which data was being collected and take it to a personal computer for transferring data.

These and other objects are achieved, in one embodiment, by an electronic device that contains several electronic subsystems. The electronic subsystems include a processor means, data storage, time of day clock, serial data interface hardware, power regulation, and operator interface. The operator interface; comprises one LED, an auto/manual mode input or select switch, an alarm speaker, and a start/stop push button switch for calibration and manual trip control. When the present invention is mounted in a motor vehicle it is connect to four electrical signals originating from a motor vehicle. The four signals needed for trip recording are: ground, vehicle power, distance pulses, and vehicle enable.

Once the trip data is saved into the present invention, the trip data can be downloaded to the computer while the present invention is mounted in the motor vehicle. If the time of day clock is battery backed, the present invention can be removed from the motor vehicle and taken to a computer located elsewhere. When the trip recorder is connected to the computer, the trip data can be downloaded. The interface is not limited to serial types like Infrared Red, or serial RS-232, but these would be the preferred methods of retrieving the trip data from the trip recorder. In order to retrieve and manipulate the trip data, a custom application program specifically written to interface with the trip recorder must be loaded onto the computer.

DESCRIPTION OF THE PREFERRED EMBODIMENT

Figure 1:
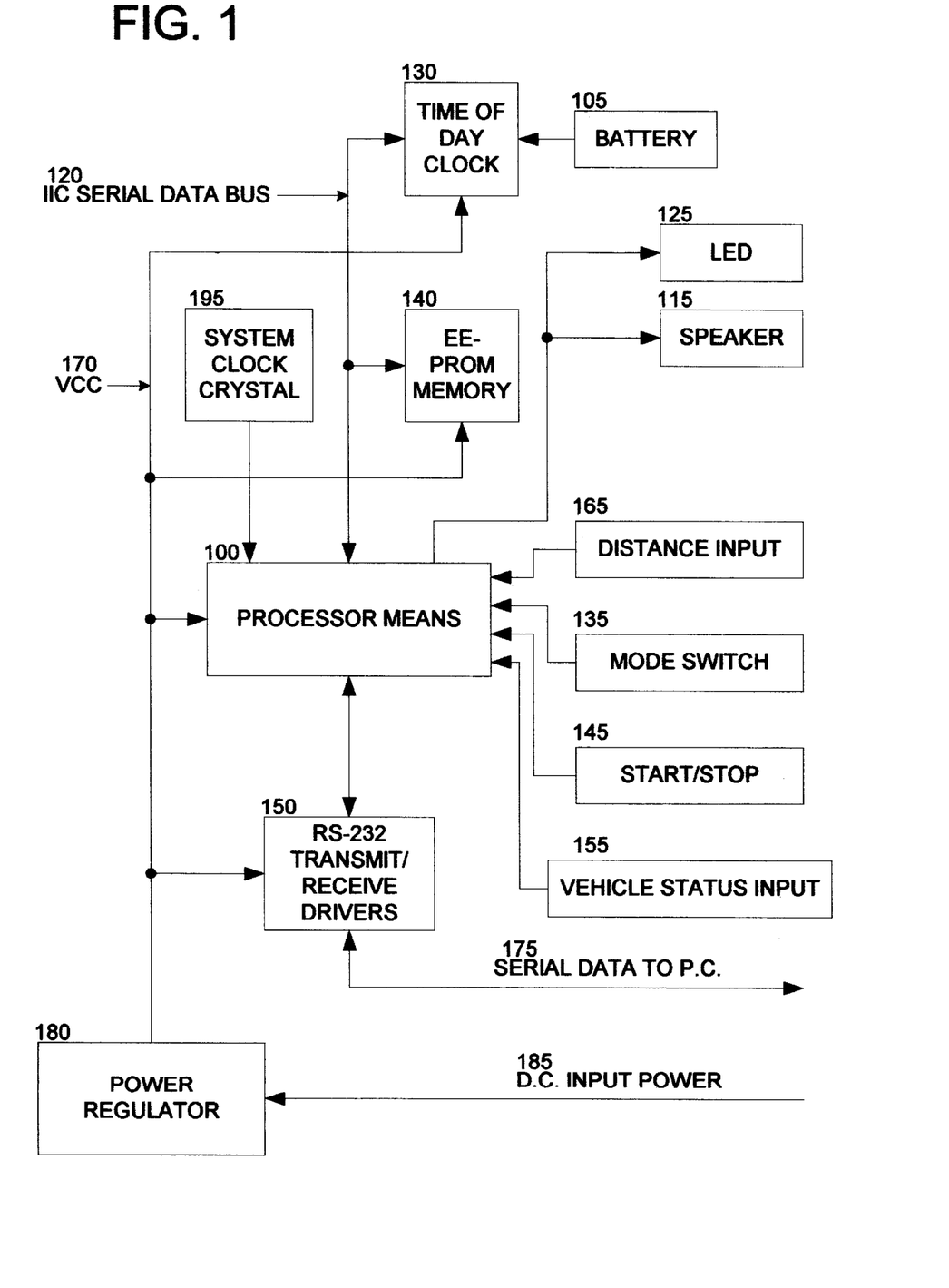
FIG. 1 is a block diagram depicting the electronic hardware of the trip recorder.

Referring to FIG. 1, a block diagram of the electrical hardware of the present invention, the "processor means" 100, controls the process of recording trip data and the user interface through the serial interface, "RS-232 Transmit/Receive drivers" 150. To minimize circuit size and cost, a two wire "IIC Serial Data Bus" 120 is used to connect the "time of day clock" 130 and the "EE-prom memory" 140 to the "processor means" 100. The "time of day clock" 130 is powered by the "battery" 105. The preferred "processor means" 100 is a reduced pin count module of the 80C51 microcontroller architecture with an IIC hardware interface incorporated, model 83C751 from Philips Semiconductors. The "system clock crystal" 195 is used to generate the required clock signals that drive the "processor means" 100. The "time of day clock" 130 is a low power CMOS device that may consume as little as 1 u amp. A suitable "time of day clock" 130 device with an IIC interface would be either a model PCF8583 or PCF8593 clock calendars, both sold by Philips Semiconductors. The "EE-prom memory" 140 device is also preferable of CMOS technology with 32K bits of data storage. This translates into over 500 trips worth of data storage. Larger EE-proms are available but for this invention a suitable part would be a model 24C32 EE-prom from Microchip Technology Inc.

The connection of the present invention to the computer is facilitated through a +5 volt powered "RS-232 Transmit/Receive drivers" 150. The "RS-232 Transmit/Receive drivers" 150, has logic voltage levels on the "processor means" 100 signal side and generates the +/−12 volt required to driver the serial data out the "serial interface" 175, to the computer. A suitable "RS-232 Transmit/Receive drivers" 150 would be a model MAX232A device from Maxim Inc. The "power regulator" 180, is a 3-terminal device capable of regulating from 7 to 30 volts D.C. into 5 volts D.C. The 5 volts D.C. is required by all electrical devices in the present invention to operate properly and is distributed across the "VCC" 170, a voltage net. A suitable "power regulator" 180, for example, would be a model LM78L05 regulator sold by National Semiconductor. The 7 to 30 volts is fed to the "power regulator" 180 through the "D.C. input power" 185 which may be connected by suitable connector to the vehicle power system.

"Speaker" 115 and "LED" 125, are used to inform the trip recorder user of the current status of the trip recorder. "LED" 125, indicates when the trip recorder is powered on, when the trip recorder is recording a trip, when the trip recorder is in calibrate mode, when the trip recorder memory is almost full, and also when the trip recorder is full. The "speaker" 115, indicates when the trip recorder is powered on, the start and completion of a trip along with the start and stop of calibration. The "mode switch" 135, indicates to the "processor means" 100, wither the trip recorder is in automatic mode or manual mode. The "start/stop switch" 145, preferably comprises a push button switch which produces the start/stop signal used in manual mode trip recording and in the calibration process.

The present invention uses a total of six signals to operate. All six of the signals are available at two separate connectors. The signals are, the power and ground which provides the "D.C. input power" 185, the "RS-232 Transmit/Receive drivers" 150 signals, the vehicle status signal from "vehicle status input" 155, and distance pulses from the "distance input" 165. One connector is preferably located at the side or front of the device and is primarily used to download data while the recorder device is mounted in the vehicle. The second connector is preferably located at the back of the recording device and primarily facilitates the connection of the present invention to the motor vehicle, but this connector could also be used interface with an external computer.

Figure 2:
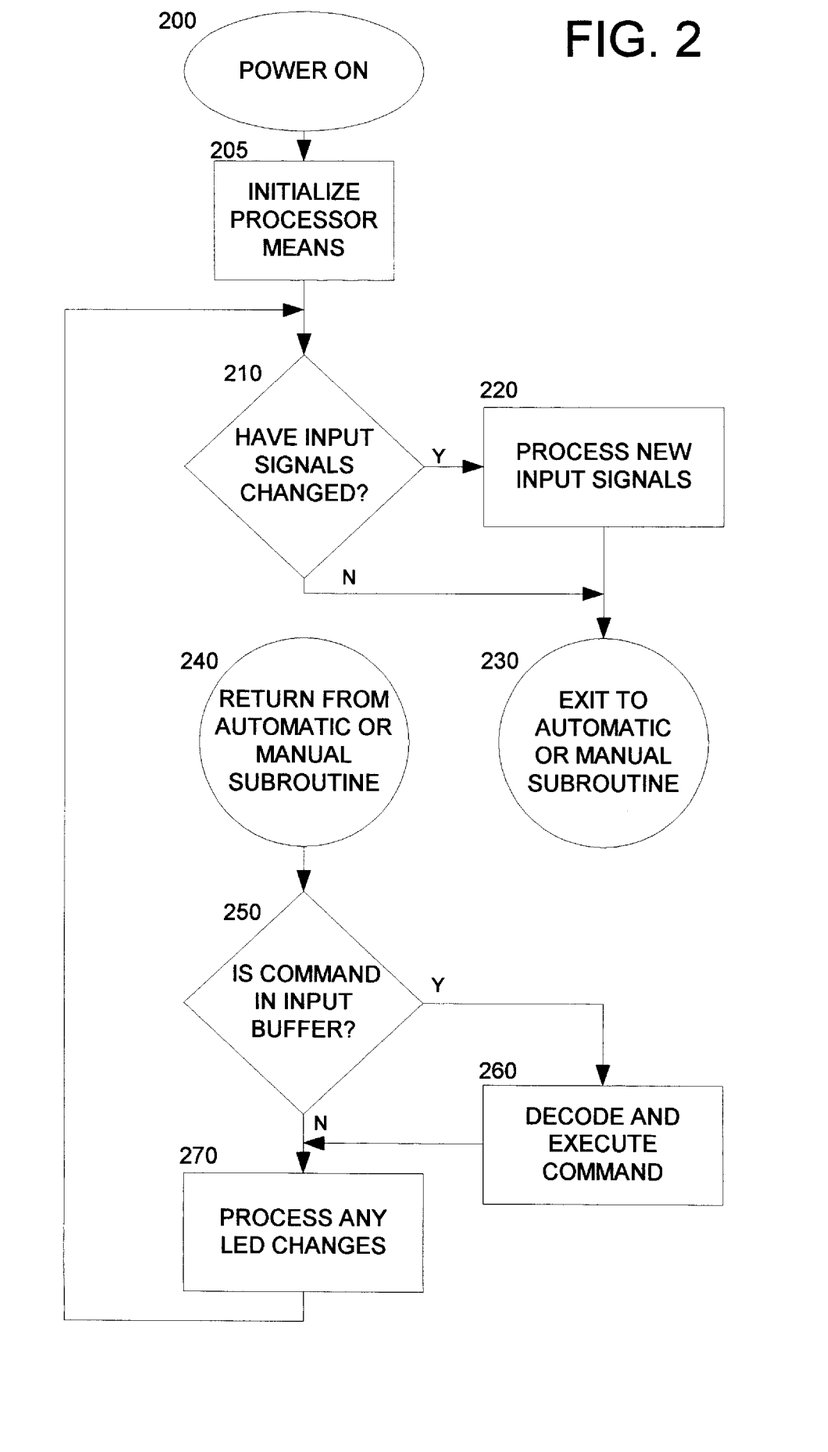
FIG. 2 is a flowchart of the main program which runs on the central processing unit in the trip recorder.
Figure 3:
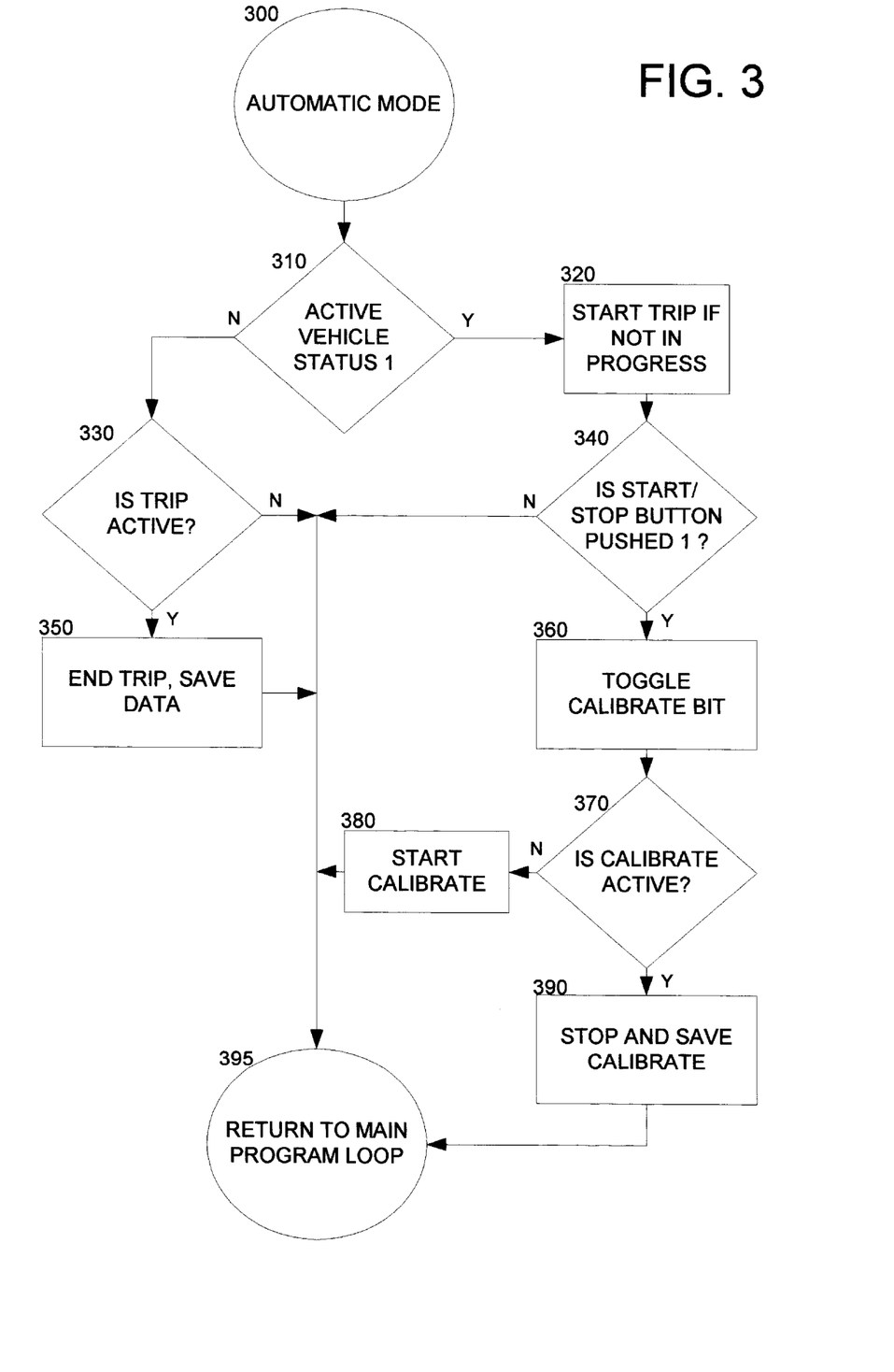
FIG. 3 is a flowchart of the automatic mode program which is called from the main program.
Figure 4:
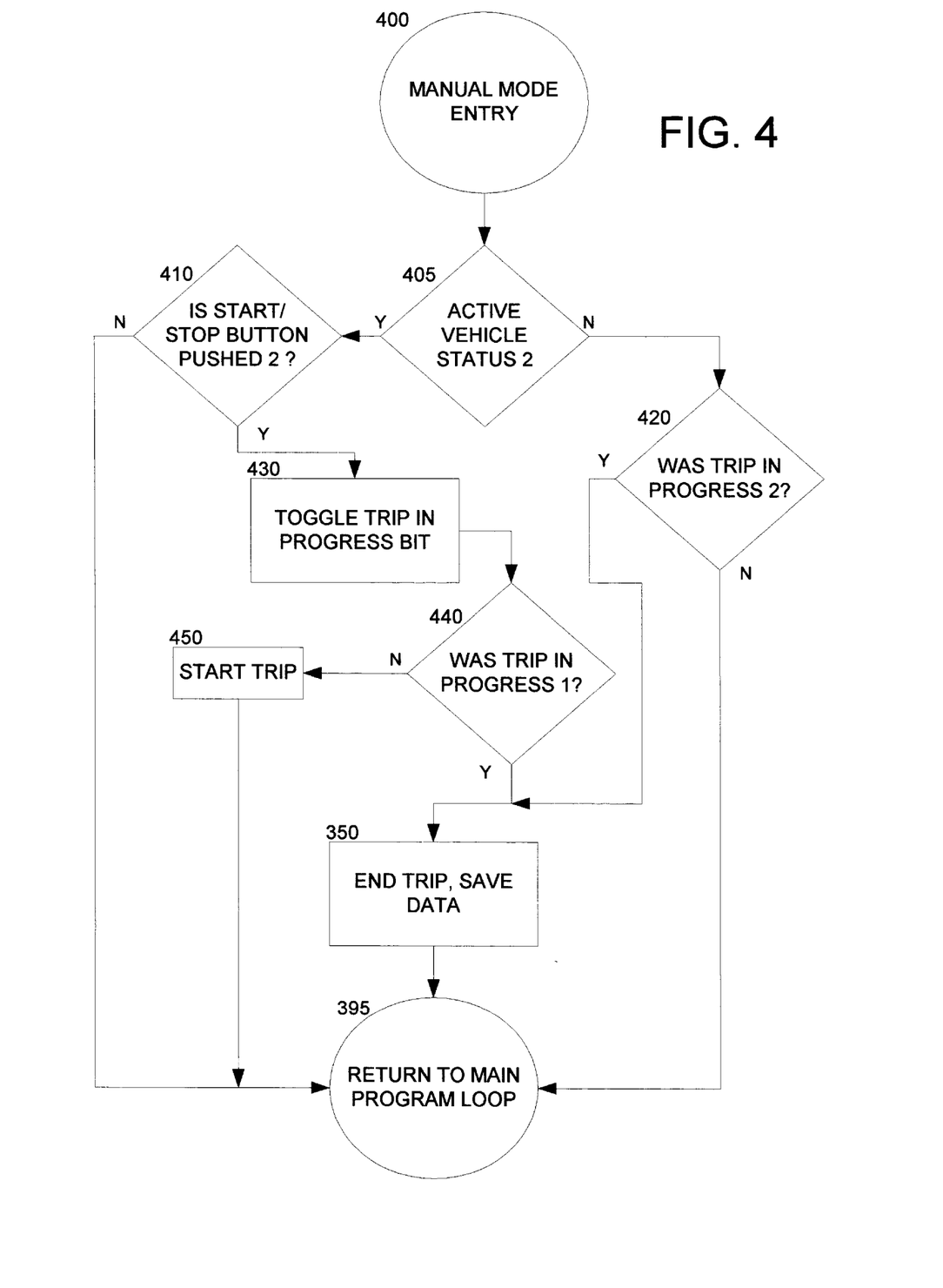
FIG. 4 is a flowchart of the manual mode program which is called from the main program.

Referring now to FIG. 2, a flowchart of the main looping routine. The "initialization processor means" 205, is processed after "power on" 200 and sets up the operational parameters for the microcontroller like activate interrupts, initialize port configurations, and sets up timer counters. Just before entering the main loop, while still at the "initialize processor means" 205, the "processor means" 100 in FIG. 1 retrieves the operational data from the "EE-prom memory" 140 so the trip recorder knows the next available location to store a trip in the "EE-prom memory" 140. Once the program is running in the main loop, In the decision diamond "have input signals changed?" 210, the two user input switches and the start trip signal are continuously monitored for changes. The process box "process new input signals" 220, is where the changes to the input signals are posted to the program. If the "mode switch" 135 is in the automatic mode, the program will pass through to the automatic subroutine when in the circle "exit to automatic or manual subroutine" 230. Refer to FIG. 3 for a description of the automatic subroutine. If the mode switch is in the manual mode, then the main loop will continuously pass through to the manual subroutine in the circle "exit to automatic or manual subroutine" 230. Refer to FIG. 4 for a description of the manual subroutine. Both the manual and automatic subroutines return to the main loop through the circle "return from automatic or manual subroutine" 240.

Another function performed in the main loop is to see if incoming data has arrived via a RS-232 interrupt. Decision diamond "is command in input buffer?" 250 determines if incoming data is detected, then the process box "decode and execute command" 260 will decode the incoming command, jump to the appropriate subroutine and perform the requested task. All incoming data is preferably in six byte records while all out going data is preferably in nine byte records. In the preferred form of the invention, 10 commands can be decoded from the incoming six byte records. The following is a list of preferred commands and their respective description which are decoded in the process box "decode and execute command" 260:

1. Read Time Date Reads the current time and data in the clock calendar and sends the data to the host computer which issuing the command.

2. Set Time Date Takes the time date data associated with this command and writes it to the clock calendar.
3. Read Register Reads the value of the register location included with this command and returns the value of that register to the host computer that issued the command.
4. Write Register Write the value included in this command to the register included in this command.
5. Download Transfers all the 8 byte records stored in EE-prom to the host computer issuing the command over the serial interface.
6. Write8 Writes the 8 byte record built by the host computer using the Write Register command described above in the transmit buffer. This record is written to the location included with this command.
7. Recall8 Reads the 8 byte storage location included in this command from the EE-prom and returns the data to the host computer that issued the command.
8. Revision Reads the revision level of the software which is located in the program memory and returns the data to the host computer that issued the command.
9. Test Starts a test of all internal subsystems and returns a completion code to the host computer that issued the command that indicate the status of the tested hardware.
10. Reset This command directs the trip recorder to a software reset that will re-initialize all operational parameters in the trip recorder.

The six byte commands to the trip recorder contains up to five bytes of data and the last byte is a checksum byte. The nine byte record sent to the host computer contains up to eight bytes of data and the ninth byte is a checksum byte.

In the Process box "process any LED changes" 270, the required state of the "LED" 125 is determined and the appropriate control signal is applied. When the trip recorder is in the calibrate mode, the process box "decode and execute command" 270 will have the "LED" 125 repeatedly blink off for a short pulse, then stay on for a long pulse. When the trip recorder is full and can no longer record more trips, the process box "decode and execute command" 270, will have the "LED" 125 repeatedly blink off for a long pulse and blink on for a short pulse. When the trip recorder reaches 80% capacity, the process box "decode and execute command" 270 will have the "LED" 125 repeatedly blink on and off at equal rates. When none of the above conditions or not true, process box "decode and execute command" 270, will keep the "LED" 125 on continuously when the trip recorder is recording a trip. Of course any suitable signal sequence may be used for the "LED" 125 to provide the desired information.

Referring now to FIG. 3, after entering the "automatic mode" 300, the starting point is the decision box, "vehicle status 1" 310. When the ignition is turned-on or some vehicle enabling signal is produced, the program will go to the process box, "start trip if not in progress" 320 and start a trip if one has not all ready started. Otherwise, the program will pass through process box, "start trip if not in progress" 320, and go to the decision box, "is start/stop button pushed 1?" 340. If the calibrate button is pushed, the program will go through the process box, "toggle calibrate bit" 360, to start or stop the collection of the unit of measure of the trip recorder. After toggling the calibrate bit, the program goes to the decision box, "is calibrate active?" 370, and will go to the process box, "stop and save calibrate" 390, if calibrate was active. If calibrate was not active, then the program will go through the process box, "start calibrate" 380, and start the recording of the unit of measure of the trip recorder.

When the ignition is turned off or the vehicle is otherwise disabled, the program will go to the decision box, is "trip active?" 330 and check to see if there is a trip currently active. If a trip is active, then the program will go to the process box, "end trip, save data" 350, and save the trip data to the "EE-prom memory" 140. Also, the program saves all the operational data like, the address of the next eight byte record and the number of records saved, at the end of the "EE-prom memory" 140. This operational data is updated after every trip because it will be recovered from the "EE-prom memory" 140 during program initialization at power-on (See process box, "initialize controller" 205). Saving this operational data after every trip permit the system electrical power to be removed from the trip recorder and the trip data will still be retained. Alternatively to using the ignition system as input for the recorder, a suitable switch may be associated with the vehicle transmission to provide a signal when the vehicle is in park. This "in park" signal and it's absence, may be used for vehicle enabled/disabled signals similarly to the "ignition on", "ignition off" signals. All process and decision boxes that exit the automatic mode to return to the main program do so through "return to main program loop" 395.

Referring now to FIG. 4 a flowchart of the manual mode, "active vehicle status 2" 405, is the first decision box processed by this subroutine after passing "manual mode entry" 400. If the ignition is on, the program will go from "active vehicle status 2" 405 to the decision box, "is start/stop button pushed 2?" 410. If the "start/stop switch" 145 (FIG. 1) is pushed, then the program will go to the process box, "toggle trip in progress bit" 430. After the trip in progress bit has been changed, then the program goes to the decision diamond, "was trip in progress?" 440. If a trip was in progress, the program will go to the process box, "end trip, save data" 460.

If a trip was not in progress, the program will leave the decision diamond, "was trip in progress 1?" 440, and go the process box, "start trip" 450. "Is start/stop button pushed 2?", "end trip, save data" 350 and "start trip" 450 exit the manual mode subroutine though the circle "return to main program loop" 395. If a trip was in process and "active vehicle status 2" 405 should de-activate, then the program will enter decision diamond "was trip in progress 2" 420. If a trip was in progress, the program will exit the decision diamond "was trip in progress 2" 420, then the program will go to the process box "end trip, save data" 350. If the trip has ended, the program will continue to pass through "was trip in progress 2?" 420 and exit back to the main program loop through "return to main program loop" 395 until "active vehicle status 2" 405 becomes active or the mode is changed to the automatic mode with "mode switch" 135.

Figure 5:
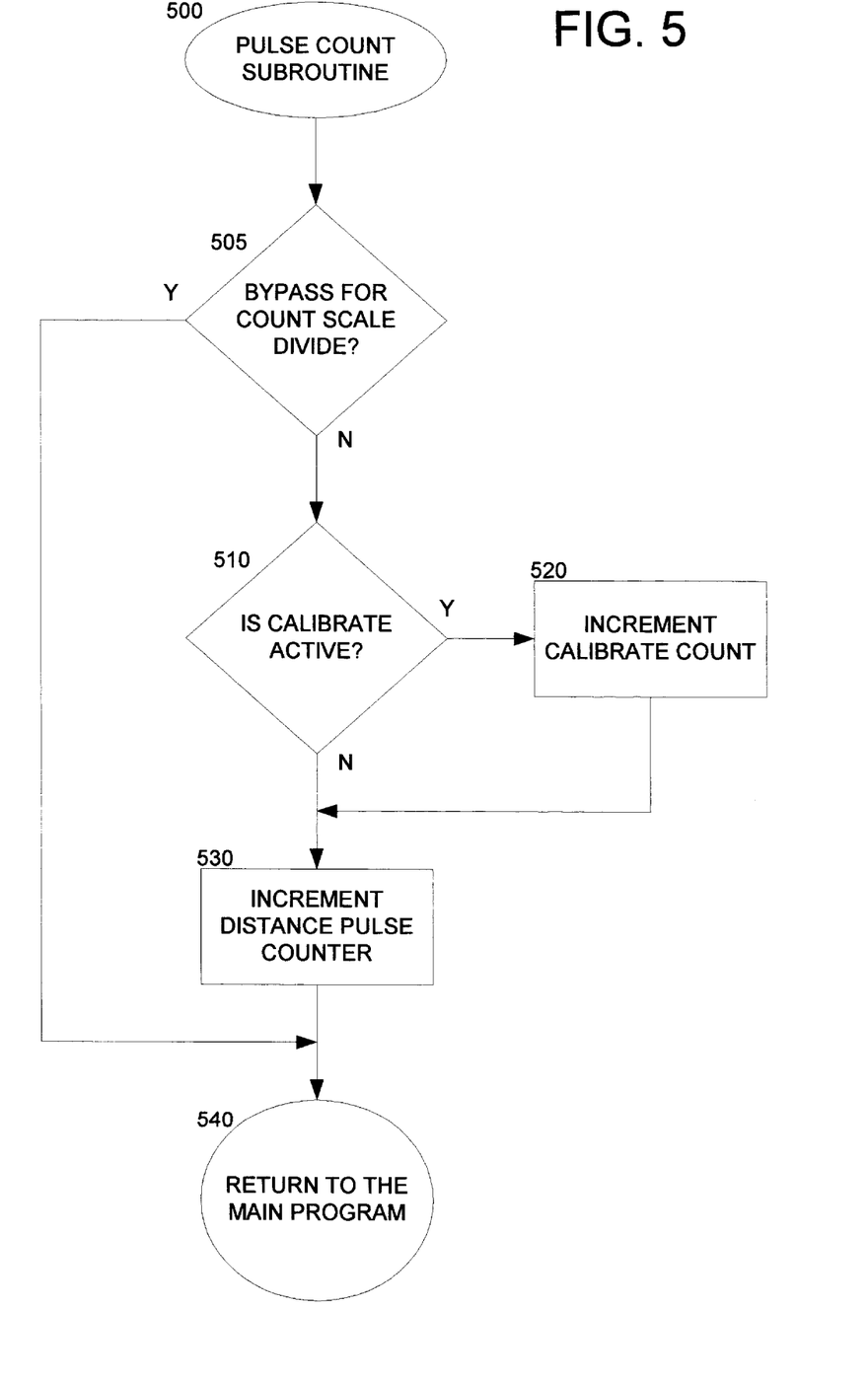
FIG. 5 is a flowchart of the distance pulse count interrupt program.

Referring now to FIG. 5, a block diagram of the distance pulse counting interrupt subroutine. After detecting a distance pulse, the program will pass through the "pulse count subroutine" 500 and first enter the decision diamond, "bypass for count scale divide?" 505. "Bypass for count scale divide?" 505, is a user programmable divide register that enables the present invention to reduce a stream of 2000 pulses per mile down to ten pulses per mile which allows for longer trips to be recorded. At ten pulses per mile, the trip recorder has approximately a 6,400 mile per trip capacity. At 100 pulses per mile, the trip recorder can record a trip of approximately 640 miles. The effect of pulses per mile occurs in the decision diamond "bypass for count scale divide?" 505.

If the bypass in not taken, then the next decision diamond "is calibrate active?" 510, is processed. If calibrate is active, then the program goes through the process box increment calibrate count then goes to the process box "increment distance pulse counter" 530. If calibrate is not active, the program will pass through the decision diamond "is calibrate active" 500, and go directly to the process box "increment distance pulse counter" 530. In the decision diamond "is calibrate active" 530, when the calibrate function has just been activated, calibrate counter is set to zero. While calibrate is active, the program will pass through the process box "increment calibrate count" 520 every time a distance pulse is detected. When a trip is first started, distance pulse counter is set to zero. both the "bypass for count divide?" 505 and "increment distance pulse counter" 530, exit this subroutine through "return to main program" 540.

Figure 6:
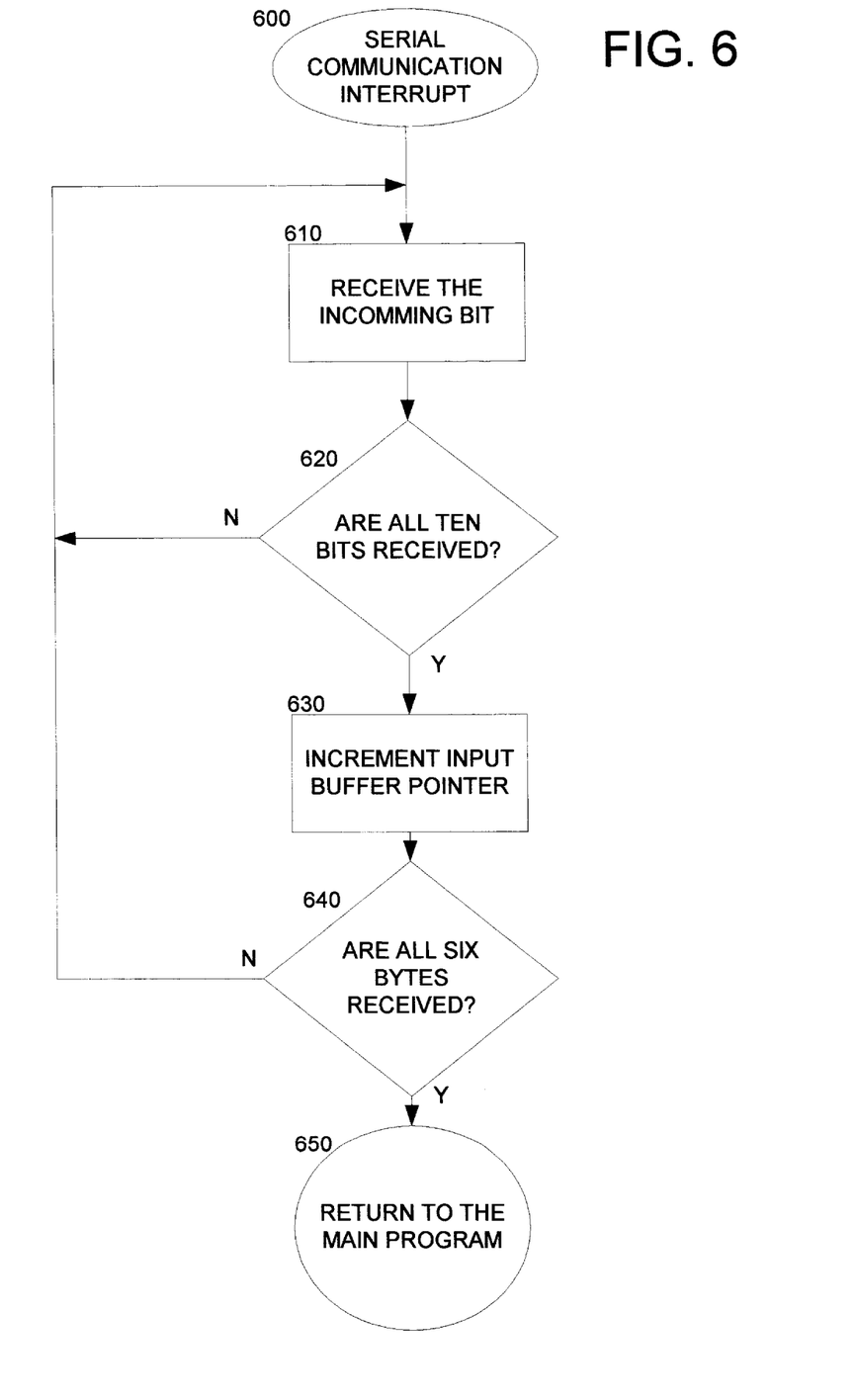
FIG. 6 is a flowchart of the serial communication interrupt program.

FIG. 6 shows a flow chart of the interrupt that processes serial communications. This routine starts at "serial communication interrupt" 600 when the incoming signal on the serial port interrupt pin goes high. Once this communications interrupt subroutine starts, it continues to maintain control of the program until all ten bits that represent the received byte of data have been collected. The process box, "receive the incoming bit" 610 switches after receiving the first bit from using the edge trigger interrupt input pin to using a timer to count the bit cell times. Once all ten bits are received, the decision diamond "are all ten bits received" 620, will exit out the yes path. When entering the process box "increment input buffer pointer" 630, the program stores the just received byte in to which the location the buffer pointer is currently pointing. Then after storing the just received byte the input buffer pointer is incremented. When the decision diamond "are all six bytes received?" 640, can exit by the yes path, the main loop is notified that all six bytes have been received and program passes through the circle "return to main program loop" 650. Control is then turned over to the main loop to process the incoming command. The incoming six byte commands are described in the FIG. 2 description.

Figure 7:
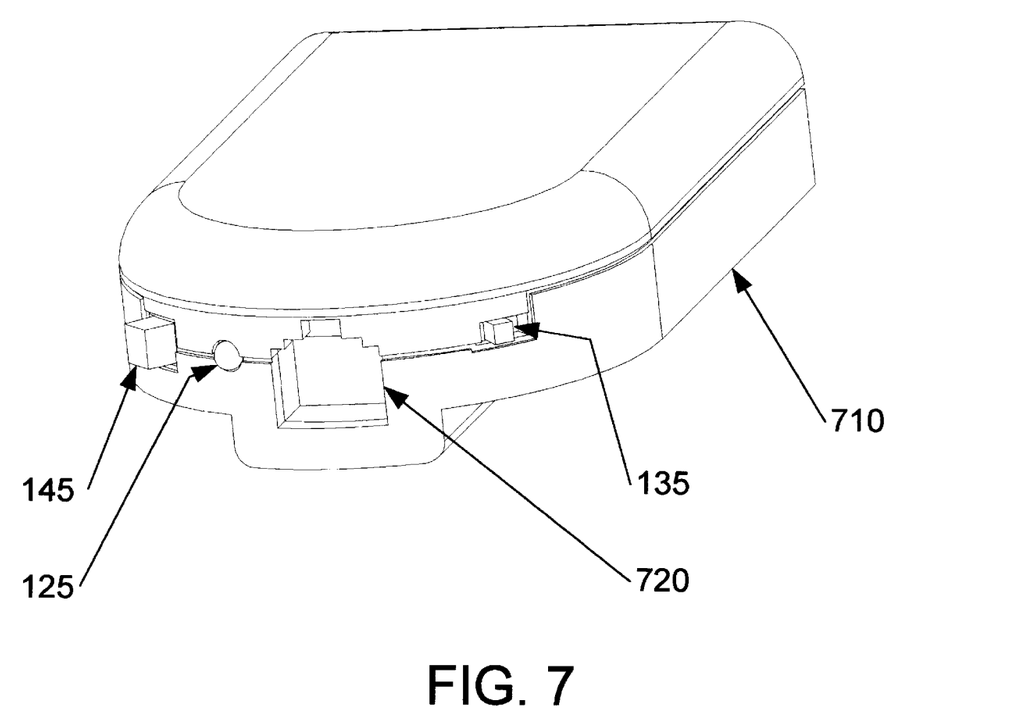
FIG. 7 is an isometric view of the trip data recorder.

FIG. 7 is an isometric drawing showing the preferred embodiment of the trip data recorder. The view is from the front and shows the "trip recorder enclosure" 710. The "downloading connector" 720 is located in the front for easy user access. The locations of the "LED" 125, the "mode switch" 135, and the "start/stop switch" 145, are also indicated in this drawing.

The described embodiment of the invention disclosed herein is in a form that can be utilized by the greatest number of people, for the minimal cost. Other variations of form and interfacing to a personal computer will be apparent to persons skilled in the art. These alternate forms and interfacing to a personal computer are within the scope and spirit of the present invention.

I claim:

1. An apparatus for collecting vehicle trip data relating to the distance traveled by a motor vehicle, the apparatus comprising:
  (a) distance input means for receiving a plurality of distance pulses from a pulse generator associated with the motor vehicle, each distance pulse relating to a distance traveled by the vehicle;
  (b) a vehicle status input for receiving a vehicle enabled signal when the vehicle is enabled for travelling and for receiving a vehicle disabled signal when the vehicle is disabled for travelling;
  (c) a start/stop switch operative to produce a start/stop signal when activated by an operator;
  (d) a mode input switch having a manual mode position and an automatic mode position, the mode input switch being operative to produce a manual mode signal when in the manual position and an automatic mode signal when in the automatic mode position;
  (e) data storage means for storing trip data, including a distance traveled by the vehicle;
  (f) processor means operatively connected to the start/stop switch, mode input switch, and data storage means, the processor means for receiving distance pulses from the distance input means, for producing manual mode trip data between a first start/stop signal and a second start/stop signal in response to the vehicle enabled signal and the manual mode signal and then for storing the manual mode trip data in the data storage means in response to the second start/stop signal, for producing automatic mode trip data continuously in response to the vehicle enabled signal and the automatic mode signal and then for storing the automatic mode trip data in the data storage means in response to the vehicle disabled signal, and for selectively retrieving trip data from the data storage means;
  (g) data interface means associated with the processor means for transferring operational data to the processor means from an external computer and for transferring trip data from the processor means to the external computer; and
  (h) power input means for providing operational power to the vehicle status input, start/stop switch, mode input switch, data storage means, processor means, and data interface means.

2. The apparatus of claim 1 further comprising:
  (a) a time of day clock operatively connected to the processor means for continuously providing a time of day and date signal and wherein the trip data also includes a start of trip time and date and an end of trip time.

3. The apparatus of claim 2 further comprising:
  (a) a back-up battery operatively connected to drive the time and date clock; and
  (b) a disconnect device mount on the apparatus for disconnecting the distance input means, the vehicle status input, and the power input from the vehicle in which the apparatus is mounted.

4. The apparatus of claim 1 further comprising:
  (a) two connectors mounted on the apparatus that each include a distance input means connector, a vehicle status input connector, a power input connector, a ground input connector, a data input connector, and a data output connector.

5. The apparatus of claim 1 further comprising an LED operatively connected to the processor means and wherein the processor means is also for driving the LED to provide a different unique indicator signal when the processor is producing trip data, when the data storage means contains over a predetermined amount of data, and when the data storage means is full of data.

6. A method of collecting vehicle travel distance from a motor vehicle, the method comprising the steps of:
  (a) receiving a plurality of distance pulses from a distance pulse generating device associated with the motor vehicle, each distance pulse relating to a distance traveled by the vehicle;
  (b) receiving a vehicle enabled signal from the vehicle when the vehicle is enabled for travelling and receiving a vehicle disabled signal from the vehicle when the vehicle is disabled for travelling;

(c) producing manual mode trip data, including a distance traveled by the vehicle, during a time interval between a first start/stop signal and a second start/stop signal in response to the vehicle enabled signal and a manual mode signal from a mode input switch and then storing the manual mode trip data in a data storage device in response to the second start/stop signal;

(d) producing automatic mode trip data continuously in response to the vehicle enabled signal and an automatic mode signal from the mode input switch and then storing the automatic mode trip data in the data storage device in response to the vehicle disabled signal.

7. The method of claim 6 wherein the step of producing trip data includes producing date and time data at the start of a trip and a stop time at the end of a trip.

8. The method of claim 6 further comprising the steps of producing a different indicator signal with an LED when trip data is being produced, the data storage device contains over a predetermined amount of data, and the data storage is full of data.

* * * * *